(12) United States Patent
Storhok et al.

(10) Patent No.: US 8,146,557 B2
(45) Date of Patent: Apr. 3, 2012

(54) DIRECT INJECTION EVENT-BASED ENGINE STARTING

(75) Inventors: Eric Storhok, Ann Arbor, MI (US); Eric Curtis, Milan, MI (US); Zheng Xu, Canton, MI (US); Jianwen Yi, Canton, MI (US); Eric Krengal, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/004,625

(22) Filed: Jan. 11, 2011

(65) Prior Publication Data

US 2011/0100314 A1 May 5, 2011

Related U.S. Application Data

(63) Continuation of application No. 11/675,535, filed on Feb. 15, 2007, now Pat. No. 7,866,303.

(51) Int. Cl.
*F02D 41/06* (2006.01)
*F02M 51/00* (2006.01)

(52) U.S. Cl. .................. 123/179.16; 123/491

(58) Field of Classification Search .............. 123/491, 123/179.16, 179.17, 299; 701/103, 113
See application file for complete search history.

(56) References Cited

U.S. PATENT DOCUMENTS

| 3,821,830 A | 7/1974 | Sundheim |
| 5,076,238 A | 12/1991 | Rosenau et al. |
| 6,557,532 B1 | 5/2003 | Nakayama et al. |
| 6,647,948 B2 * | 11/2003 | Kyuuma et al. ............... 123/491 |
| 6,823,832 B2 | 11/2004 | Henning et al. |
| 6,912,989 B2 * | 7/2005 | Tayama et al. ............... 123/299 |
| 6,978,759 B2 | 12/2005 | Iriya et al. |
| 7,024,851 B2 | 4/2006 | Akagi et al. |
| 7,047,945 B2 * | 5/2006 | Ishii et al. ................... 123/491 |
| 7,370,629 B2 * | 5/2008 | Köhler et al. ................ 123/299 |
| 2003/0192504 A1 | 10/2003 | Nakayama et al. |
| 2005/0005901 A1 | 1/2005 | Kufferath et al. |
| 2005/0241619 A1 | 11/2005 | Strayer et al. |
| 2006/0278196 A1 * | 12/2006 | Beer et al. .................... 123/299 |
| 2007/0012283 A1 | 1/2007 | Rockwell et al. |
| 2007/0068485 A1 * | 3/2007 | Hilditch ...................... 123/299 |
| 2007/0119414 A1 | 5/2007 | Leone et al. |
| 2008/0196695 A1 * | 8/2008 | Storhok et al. ............... 123/478 |
| 2008/0245342 A1 * | 10/2008 | Werner ........................ 123/491 |

FOREIGN PATENT DOCUMENTS

| JP | 08-193536 | 7/1996 |
| JP | 2002-213151 | 7/2002 |
| JP | 2006-057514 | 3/2006 |
| JP | 2006-144725 | 6/2006 |
| JP | 2006-250050 | 9/2006 |
| WO | 2007011463 | 1/2007 |

* cited by examiner

*Primary Examiner* — Stephen K Cronin
*Assistant Examiner* — Arnold Castro
(74) *Attorney, Agent, or Firm* — Allan J. Lippa; Alleman Hall McCoy Russell & Tuttle LLP (57) ABSTRACT

A method for starting an internal combustion engine having direct fuel injection, comprising of adjusting a number of direct injections per combustion cycle based on a cylinder event number from a first cylinder event.

11 Claims, 7 Drawing Sheets

| FIRING CYLINDER (1-3-4-2) | COMBUSTION EVENT | INJECTION FOR EXAMPLE CONDITION 1 (NUMBER/TIMING) | INJECTION FOR EXAMPLE CONDITION 2 (NUMBER/TIMING) | INJECTION FOR EXAMPLE CONDITION 3 (NUMBER/TIMING) |
|---|---|---|---|---|
| 1 | 1 | C;C | C;C | I |
| 3 | 2 | I;C | C | I |
| 4 | 3 | I;C | C | I |
| 2 | 4 | I;C | C | I |
| 1 | 5 | I;C | I | I |
| 3 | 6 | I;C | I | I |
| 4 | 7 | I;I | I | I |
| 2 | 8 | I;I | I | I |
| 1 | 9 | I;I | I | I |
| 3 | 10 | I | I | I |
| 4 | 11 | I | I | I |
| 2 | 12 | I | I | I |
| 1 | 13 | I | I | I |
| ... | ... | ... | ... | ... |

FIG. 4

| I | C | I:I | I:C | C:C |
|---|---|---|---|---|

| COMBUSTION EVENT NUMBER | INJECTION 1 START (OR END) ANGLE | INJECTION 1 AMOUNT (OR DURATION) | INJECTION 2 START (OR END) ANGLE | INJECTION 2 AMOUNT (OR DURATION) | ... |
|---|---|---|---|---|---|
| 1 (FIRST COMBUSTION) | SA11 | M11 | SA12 | M12 | ... |
| 2 | SA21 | M21 | SA22 | M22 | ... |
| 3 | SA31 | M31 | SA32 | M32 | ... |
| 4 | SA41 | M41 | SA42 | M42 | ... |
| 5 | SA51 | M51 | SA52 | M52 | ... |
| 6 | SA61 | M61 | SA62 | M62 | ... |
| ... | ... | ... | ... | ... | ... |

| COMBUSTION EVENT | INJECTION FOR 1ST EXAMPLE START (NUMBER/TIMING) |
|---|---|
| 1 | C;C *|
| 2 | C |
| 3 | C ** |
| 4 | I |

FIG. 9A

| COMBUSTION EVENT | INJECTION FOR 2ND EXAMPLE START (NUMBER/TIMING) |
|---|---|
| 1 | C;C |
| 2 | C;C *** |
| 3 | I |
| 4 | I |

DIRECT INJECTION EVENT-BASED ENGINE STARTING

CROSS REFERENCE TO RELATED APPLICATIONS

The present application is a continuation of U.S. patent application Ser. No. 11/675,535 filed Feb. 15, 2007, the entire contents of which are incorporated herein by reference.

BACKGROUND AND SUMMARY

Cold start engine exhaust emissions is a key component for overall vehicle emission control. During the cold start, it may be difficult to achieve full combustion during the crank and run up on an engine and still maintain the minimum emission requirements. Specifically, direct injection gasoline engines may have several unique issues during starting, such as larger variation in injection rail pressure and/or more limited air and fuel mixing. Further, unlike port injection, most all of the fuel injected is present in the cylinder, and therefore if not combusted it may leave the engine as unburnt hydrocarbons.

The above issues may be exacerbated by the rapid changes in cylinder conditions during the engine starting/cranking/run-up process. For example, cylinder charge motion, fuel-air mixing, residual gas amounts, residual temperatures, cylinder temperatures, etc., can rapidly change from one combustion event to the next.

The inventors herein have recognized that the number and/or timing of injections during the engine staring process can also result in large variation in cylinder conditions, such as mixing, etc., and thus when correlated with the cylinder combustion event number from a first combustion, for example, may be varied in selected ways to achieve improved combustion over a greater range of events in a more repeatable fashion.

In one particular example, improved starting may be achieved by a method for starting an internal combustion engine having direct fuel injection, comprising adjusting a number of direct injections per combustion cycle based on a cylinder event number from a first cylinder event.

Of course, various alternatives may also be used, such as those described herein.

BRIEF DESCRIPTION OF THE FIGURES

FIGS. 3A-N describe various examples of fuel injection modes;

DETAILED DESCRIPTION

Figure 1:
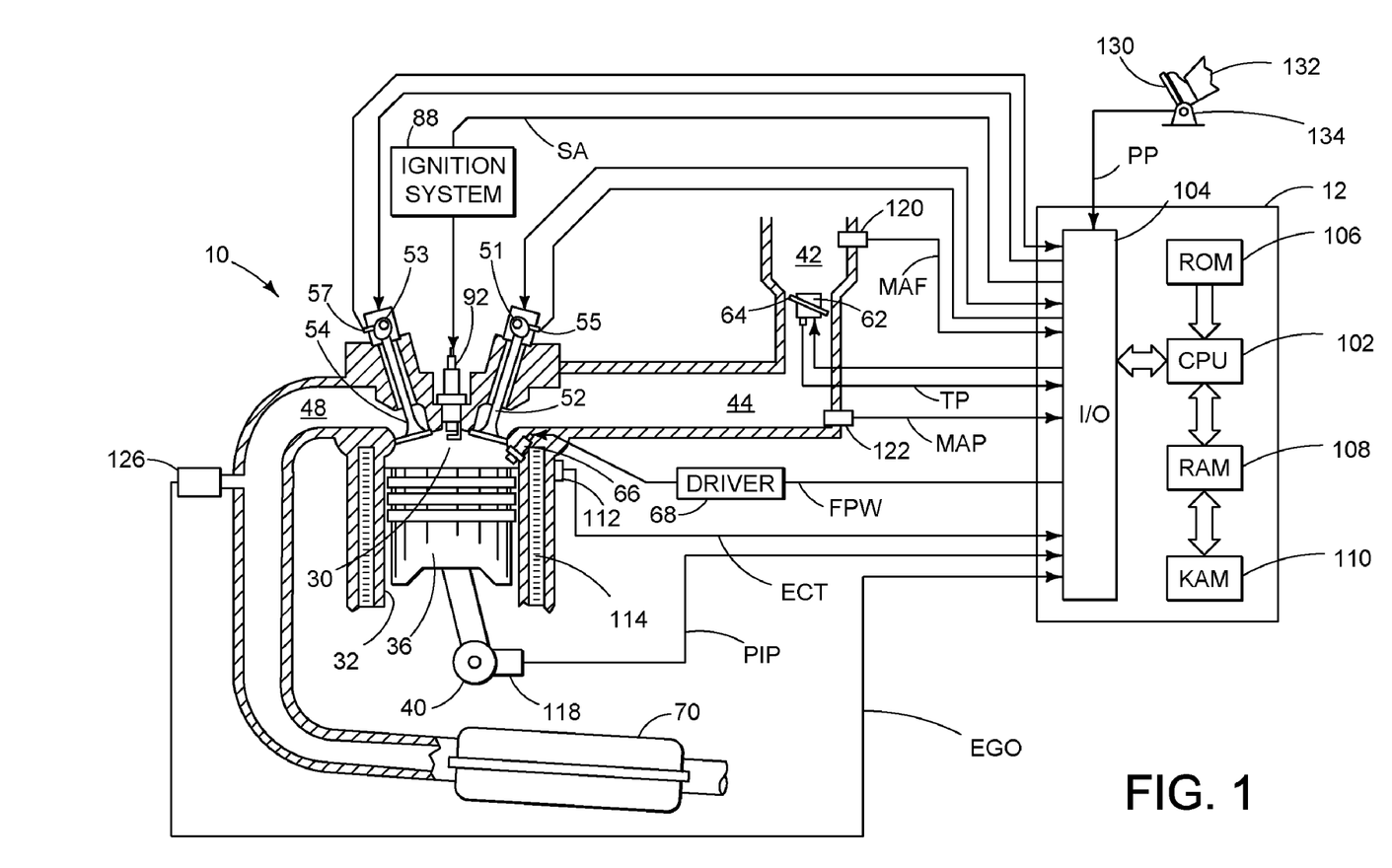
FIG. 1 shows a schematic diagram of an engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; throttle position (TP) from a throttle position sensor; and absolute manifold pressure signal, MAP, from sensor 122. The crank angle may be determined by the controller by a profile ignition pickup signal (PIP) from Hall effect sensor 118 (or other type) coupled to crankshaft 40. As one example, the controller can process the PIP signal with a cam shaft position signal to determine crank angle. Engine speed signal, RPM, may also be generated by controller 12 from signal PIP. Alternatively, other suitable crank angle sensors may be used. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake/exhaust valves, fuel injector, spark plug, etc.

Cylinder 30 described above may operate in what may be referred to as a four stroke cycle. The four stroke combustion cycle may include an intake stroke, a compression stroke, a power stroke, and an exhaust stroke, wherein the four strokes may be repeated. During the intake and power strokes, the piston travels away (e.g. downward) from the intake and exhaust valves, while during the compression and exhaust strokes, the piston moves toward the intake and exhaust valves. In particular, during the compression stroke, the upward movement of the piston causes compression of an air and/or fuel mixture within the combustion chamber.

During some conditions, the engine or one or more of the cylinders thereof may be shut-off or deactivated. As one non-limiting example, during an idle condition of the engine, one or more cylinders may be deactivated by discontinuing fueling and/or spark within these cylinders. When an increase in engine output is requested, one or more of the cylinders of the engine may be re-started whereby fueling and/or spark are reinitiated. In conditions where only a portion of the cylinders of the engine are deactivated, the engine may have sufficient kinetic energy to re-start the deactivated cylinders with or without assistance from a starter motor. Alternatively, where all of the cylinders are started from a deactivated or shut-off state, then a starter motor may be operated to assist in cranking.

Figure 2:
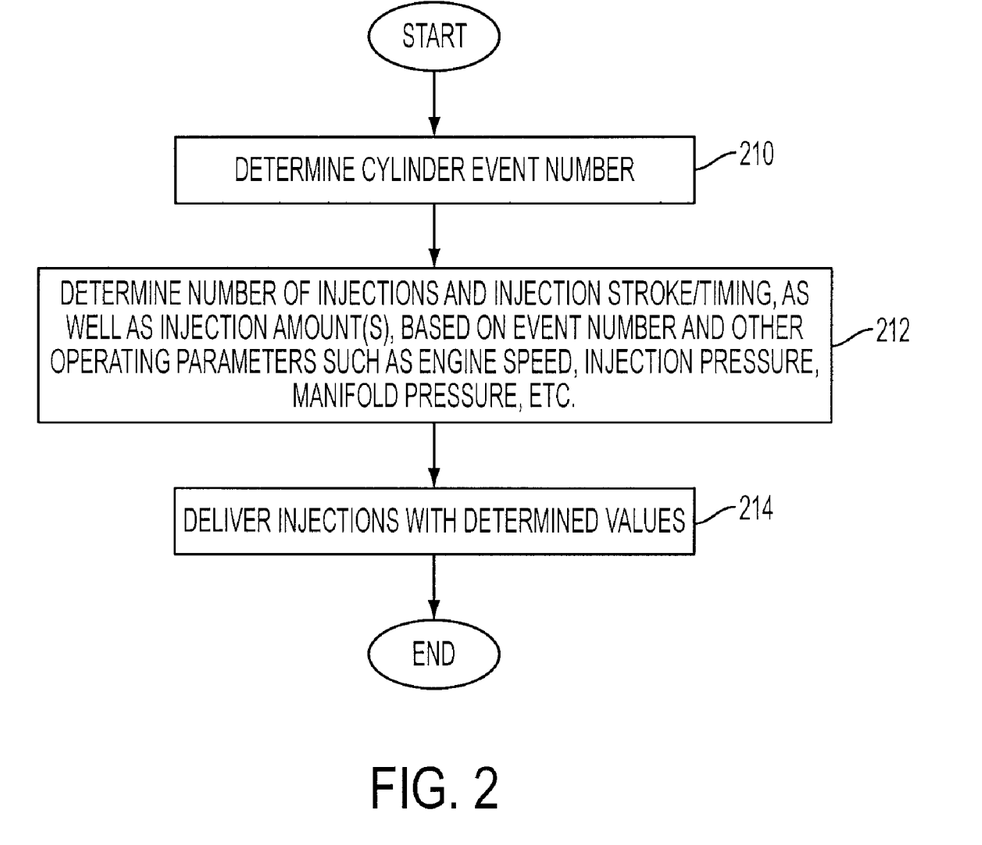
FIG. 2 shows a high level flowchart for event-based engine starting for a control system that varies a number of injections and/or injection timing during engine cranking, run-up, or initial stabilization of engine speed.

Referring now to FIG. 2, a high level flow chart of a routine that may be used during various engine operating conditions, such as engine starting, is described. Control of direct fuel injection during engine staring and the resulting combustion performance, emissions, etc., may be affected by many parameters, conditions, and factors. Further, these conditions may vary greatly from one combustion event to the next, especially during engine staring, even changing significantly from one event to the next. For example, engine speed, manifold pressure, exhaust pressure, temperatures, residuals, charge motion and flow patterns (e.g., swirl, tumble, etc.), air-fuel mixing, injection pressure etc. all can vary greatly during the start thereby influencing burn rate, burn duration (or burn-out), emission formation, torque production, and misfire to name a few. These large variations during a start can be further exasperated in the example of direct injection, where combustion performance may be especially sensitive to injection timing and a number of injections.

However, while these parameters (and the corresponding influences) vary greatly from one event to the next during the start, they may also be highly correlated to the combustion events of the engine. For example, under some conditions, multiple injections in a particular stroke during a first combustion event from the start may result in improved combustion, yet during a second or subsequent event the same injection mode may degrade performance. Likewise, under other conditions, a single injection in a particular stroke during a first combustion event may degrade combustion, yet during a second or subsequent event the same injection mode may improve performance.

As such, during a start, it may be advantageous to vary a number of injections during the combustion cycle with cylinder events. Additionally, or alternatively, it may be advantageous to vary an injection timing of directly injected fuel, such as by varying the stroke of at least some of the injection with cylinder events. Further still, other parameters may be adjusted during the start with cylinder events, such as charge motion valves, spark timing, the amount of directly injected fuel, etc. In this way, it may be possible to advantageously use the strong effects of these parameters to counteract the large variation in combustion performance during a start based on the cylinder event, as the cylinder events progress.

Referring now specifically to FIG. 2, first in 210, the routine determines a cylinder event number. For example, the event number may correlate to the number of combustion events from first combustion event, number of combustion events from a first combustion event having a certain characteristics (e.g., greater than a predetermined percentage of complete combustion), number of injections from first injection event, number of strokes from a first stroke event, etc.

Next, in 212, the routine determines a number of injections per cycle for a given cylinder combustion event based at least on the event number of 210. Further, the routine may determine other parameters, such as injection timings (e.g., durations, strokes, etc.) for the injection(s) based at least on the event number of 210. Other parameters that may be used to adjust the determined number of injections and/or injection timings include a temperature (e.g., engine coolant temperature), engine speed, manifold pressure, ambient pressure, etc. Further still, other parameters may also be determined based on the event number, such as fuel injection amount (e.g., total amount of injected fuel, amount per injection, etc.), ignition timing, throttle position, desired air amount, desired manifold pressure, charge motion control valve position, and others.

For example, the routine may select among various injection numbers of injections per cycle and injection timings/strokes, such as those described with regard to FIGS. 3A-N, for example, based on the combustion event.

Finally, in 214, the routine implements or delivers the injection parameters determined in 212 and/or in other routines. As such, the number of injections, injection timing/stroke, and injection amounts may vary as the number of events incrementally occur.

In addition to varying the number of injection responsive to engine cylinder events, the amount of fuel delivered may also be adjusted responsive to engine cylinder event number. For example, as the engine speeds up, the amount of fuel needed for stable combustion may drop as much as 30%. Thus, the amount and timing of direct injection fuel delivery may be correlated with events. In this way it is possible to trim each event so that the stratification from a split injection (if present) can provide a robust and low emission combustion. For example, at cranking speeds, in the first event of combustion, a pair of injection for the compression stroke may be used for the first combustion event (e.g., to reduce total fuel used), but subsequent events may use either an pair of injections in the intake stroke, or one injection for intake, another for compression.

While the above examples are illustrative, the approaches described herein may use various combinations of timing for each event during the crank and run up portion of its operation. This enables the control system to trim each event to meet the needs of the engine at any given temperature or combustion event, for example.

Figure 3:
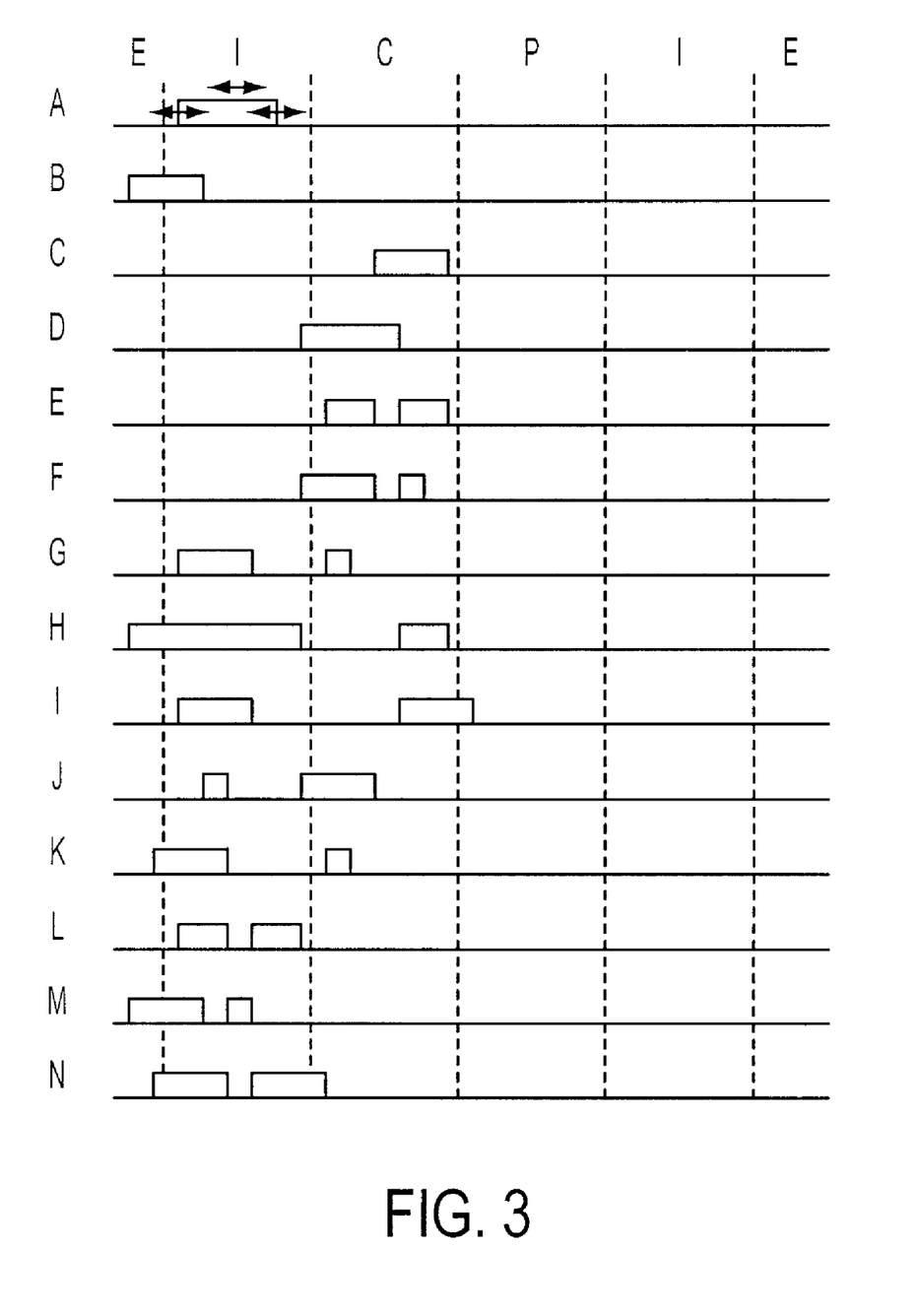

Referring now to FIG. 3, various examples of multiple and single injections are described to illustrate various example injection modes that may be used as noted herein. In these figures, the timing/stoke indicated is defined by piston position, for example, where movement from top dead center to bottom dead center defines the intake stroke. Specifically, FIGS. 3A-N shows each cycle of a 4-stroke combustion cycle including an intake stroke (I), compression stroke (C), power stroke (P), and exhaust stroke (E).

Specifically, FIG. 3A shows a single intake stroke injection, where the full duration of the injection occurs within the intake stroke. Such an injection may be designated herein as "I". While this shows a specific start timing and duration, these may be adjusted based on various operating conditions, including the event number, as indicated by the arrow. For example, the injection start angle, end angle, and duration may all be adjusted based on operating conditions during the start.

FIG. 3B shows a single injection that occurs at least partially (and in this case mostly) during the intake stoke (and partially during the exhaust stroke). Such an injection may also be designated herein as "I". While this shows a specific start timing and duration, these may be adjusted based on various operating conditions, including the event number. While this example shows an end of injection timing earlier than that of FIG. 3A, as noted above the timings may be adjusted, and may even end during the compression stroke, for example.

FIG. 3C shows a single compression stroke injection, where the full duration of the injection occurs within the compression stroke. Such an injection may be designated herein as "C". While this shows a specific start timing and duration, these may be adjusted based on various operating conditions, including the event number.

FIG. 3D shows a single injection that occurs at least partially (and in this case mostly) during the compression stoke (and partially during the intake stroke). Such an injection may also be designated herein as "C" or "I". While this shows a specific start timing and duration, these may be adjusted based on various operating conditions, including the event number. While this example shows an end of injection timing earlier than that of FIG. 3C, as noted above the timings may be adjusted, and may even end during the power stroke, for example.

FIG. 3E shows two compression stroke injections, where the full duration of each of the injections occurs within the compression stroke. Such an injection may be designated herein as "C:C". While this shows a specific start timing and duration, these may be adjusted based on various operating conditions, including the event number. Further, one or more of the injections may be at least partially outside the compression stroke, such as the example of FIG. 3F, in which the first injection is partly during the intake stroke and partly during the compression stroke (and which may be designated as C:C or I:C). Again, the timings may be varied, and the ending timing of the second injection may be during the power stroke, for example.

FIG. 3G shows an intake stroke injection and a compression stroke injection, where the full duration of the intake injection is within the intake stroke and the full duration of the compression injection is within the compression stroke. Such an injection may be designated herein as "I:C". While this shows a specific start timing and duration, these may be adjusted based on various operating conditions and may extend beyond the intake and compression strokes, respectively, as already described herein above, and as indicated in FIGS. 3H, 3I, and 3J each of which may also be designated herein as "I:C". Further, the timing of FIG. 3J may also be designated herein as "I:I".

In one example, it may be advantageous to perform I:C injection for a first combustion event and a plurality of subsequent combustion events in cranking operation, possibly continuing I:C through a catalyst warm-up operation including using retarding ignition timing during idle speed control to increase exhaust gas heat at an elevated engine idle speed. Such an injection approach can provide sufficient mixing via the intake stroke injection, with a slightly rich mixture via the compression injection. This can improve combustion stability while providing acceptable HC emissions and also reduce the need for over-fueling.

FIG. 3K shows still another example similar to that of FIG. 3H, but with different duration and start/end timings, although during the same strokes. Thus, FIG. 3H illustrates just one example of how the injections may be adjusted without changing the injection stroke, e.g., by varying duration, start angle, end angle, relative duration between the two injections, etc., all of which may be varied with the combustion event number.

FIG. 3L illustrates an example with two intake injections, each fully within the intake stroke, which may be designated by "I:I" herein. Again, variations are possible as indicated in FIGS. 3M and 3N, for example, indicating how the injections may each at least partially fall under other strokes, although still each substantially during the intake stroke. Again, each of 3M and 3N may be designated by "I:I" and further the approach of FIG. 3M may also be designated herein as "I:C".

As indicated above, a designation of "I:I", for example, indicates that two injections are utilized, with each occurring at least partially during the intake stroke, and possibly (although not necessarily) where each occurs substantially during the intake stroke and/or each is fully within the intake stroke. Likewise, a designation of "C:C", for example, indicates that two injections are utilized, with each occurring at least partially during the compression stroke, and possibly (although not necessarily) where each occurs substantially during the compression stroke and/or each is fully within the compression stroke, and so on with respect to the various other designations noted herein.

Thus, while the above examples show injections that may span one or more strokes, in one example an injection designated as occurring in a specific stroke may be substantially during that stroke, even though it may partially extend into one or more other strokes. Further, any of the above timings can be varied with operation conditions, including a cylinder event number, to occur earlier, later, change the duration of injection, and/or change the relative amount of fuel delivered between multiple injections.

Note that there are various approaches for changing injection timing, including with event number, such as changing a stroke during which an injection is fully delivered (e.g., 3A to 3C), changing a stroke during which at least some of the directly injected fuel is delivered, (e.g., 3A to 3B), changing a stroke during which a majority of the fuel is delivered (e.g., 3B to 3D), changing a timing of fuel delivery within a stroke (e.g., 3C to 3D), others, and combinations thereof.

Figure 4:
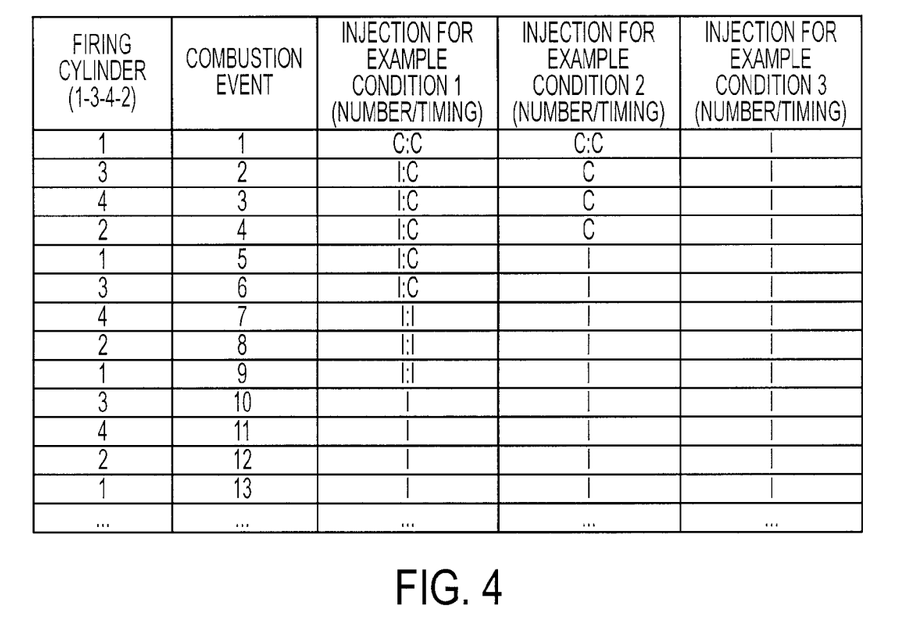
FIG. 4 shows various example injection modes that may be selected.

Referring now to FIG. 4, various example injection modes are described, including intake stroke injection (I), compression stroke injection (C), multiple injections including two intake stroke injections (I:I), multiple injections including an intake stroke injection and a compression stroke injection (I:C), multiple injections including two compression stroke injections (C:C), and possibly others. Note that, as described above herein, intake stroke injection may include injection timing fully within or at least partially during the intake stroke, and compression stroke injection may include injection timing fully within or at least partially during the compression stroke, for example.

Specifically referring to the Compression:Compression (C:C) injection mode, for certain engine temperatures and/or fuel injection pressures, a combustion chamber may produce reduced regulated emissions by injecting fuel twice during the compression stroke for the first combustion event, for example. This allows a semi-homogeneous cloud of fuel plus a localized rich mixture to ignite it for the first combustion event from the engine start during cranking of a cold engine start.

Referring to the Intake:Compression (I:C) injection mode, the controller may operate to vary the injection timing based on fuel pressure, engine speed, and engine starting temperature so that there is a robust rich mixture around the spark plug during ignition. The intake stroke injection produces a homogeneous charge that may be too lean to ignite by itself, but can sustain stable combustion if there is enough combustion energy from another source. The compression stroke injection produces a locally rich mixture around the spark plug that can robustly ignite.

For fuel pressure variation, the timing of these events may be adjusted so that 1) the homogeneous charge does not overly penetrate the combustion chamber and condense on the chamber walls, and 2) the momentum of the fuel injection will not move the rich compression injection past the spark plug.

With regard to engine speed, the timing may be varied so that the time that it takes to inject the fuel can be adjusted so that the mixture will remain around the spark plug area. With regard to coolant temperature variations, the controller may operate to inject the compression event as late as possible (e.g., in a later part of the compression stroke depending on the injection duration), so that the fuel may be better evaporated due to the heat of compression. Also, the split ratio between the intake and compression injections (e.g., relative amount of fuel delivered) may be altered so that the fuel mass injected during the compression stroke does not change, but the fuel injection during the intake stroke can be altered in a manner to adjust for the natural condensation on cold cylinder walls and piston crown. For example, the intake stroke injection amount can be varied with events and based on temperature to gradually decrease as the condensation varies.

Referring to the Intake:Intake (I:I) injection mode, this mode allows for a homogeneous fuel/air charge but allowing that long injection times cause fuel to spray across the chamber to the cylinder walls and piston crown. The controller may operate to vary injection timing in response to engine speed so that both injections will properly mix in the chamber for a truly homogeneous charge.

Using the example approach of FIG. 2, for example, one or more (or all) of the above injection timing modes can be calibrated to vary in response to combustion events to account for engine combustion chamber design variation, injector design and targeting, charge motion variation, etc. Further, in some examples, each of the various injection modes may have limited conditions in which it may be available, e.g., temperature, RPM, injection pressure, load, exhaust temp, EGR level, cam timing, air-fuel ratio, etc. As such, the selection of injection mode may consider more than the combustion event number, but may be further based on one or more of the above conditions.

Figure 5:
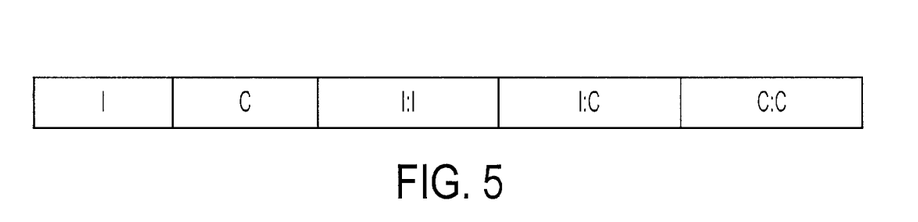
FIG. 5 shows a table illustrating example injection modes for a plurality of events from the first engine cylinder event.

Referring now to FIG. 5, a table is shown illustrating three example starting conditions and the corresponding injection mode further determined based on the combustion event number. Specifically, FIG. 5 shows the combusting cylinder for an example four cylinder engine with a firing order of 1-3-4-2, the combustion event number counting the number of combustion events from a first combustion event, and the injection mode and timing for three different conditions. The different conditions may be different temperature conditions, different barometric pressures, fuel rail/injection pressure, different shut-down durations, or various other parameters, or combinations thereof.

For the first condition, the first combustion event receives a double compression stroke injection, and then each of the next five combustion events may operate with I:C injection. Then, for the next three subsequent events, I:I injection may be used, followed by I injection for the remainder of the events that are individually controlled. At the second condition, the first event operates with C:C injection, the next three events operate with C injection, and then the remainder of the events operate with I injection. Finally, the third example shows operation for all events using I injection.

Note that after a predetermined number of events, for example, the number and/or timing of injection selection may be driven by other parameters and thus be independent of the event count. The predetermined number of events may vary with operating conditions, such as the shut-down and/or restart conditions (e.g., time since start or other parameters distinguishing a cold start versus a warm/hot re-start such a may occur during stop-start idle operation). Further such conditions may also be used to select the injection mode for a given event number.

Figure 6:
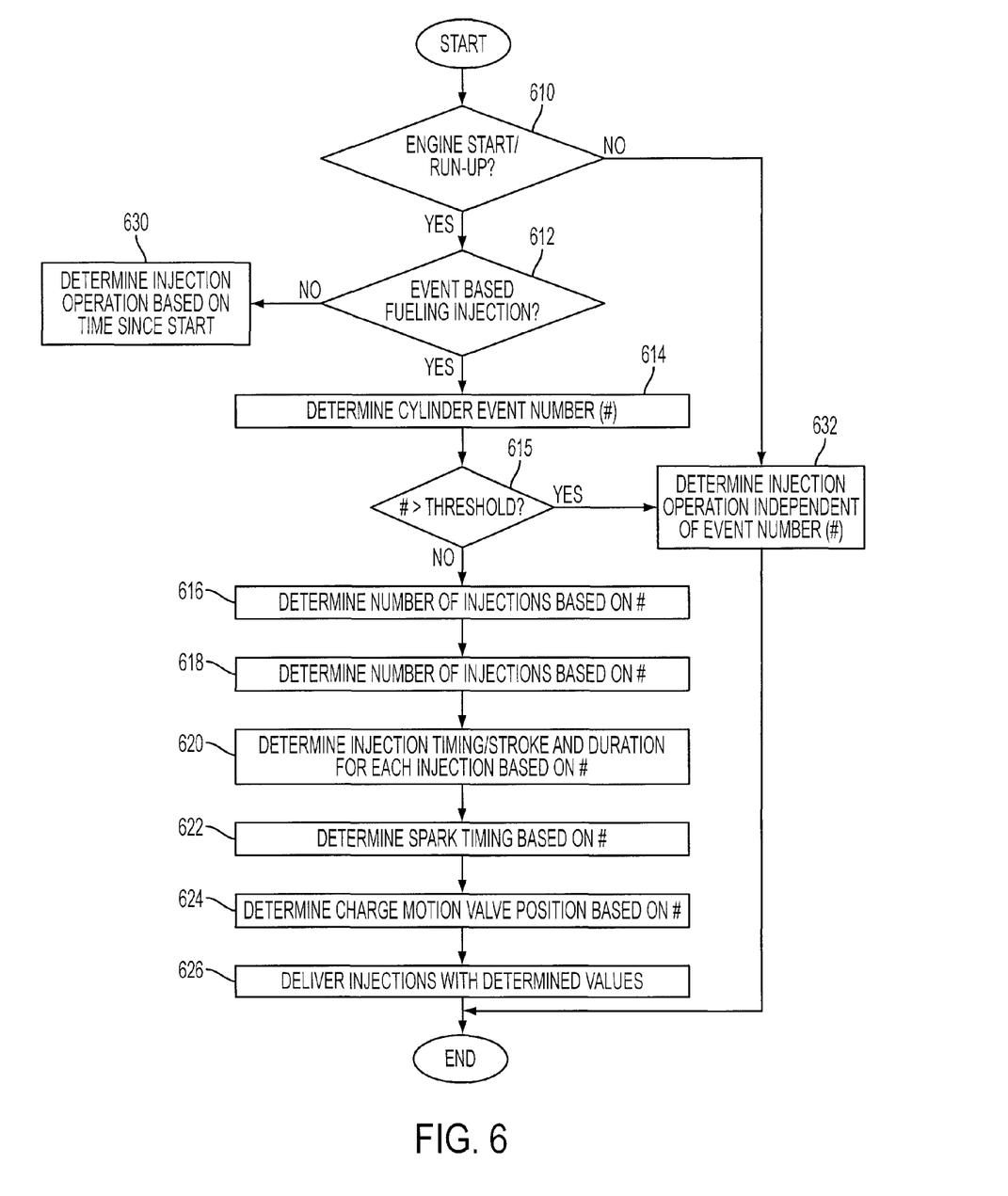
FIG. 6 shows an example high level flowchart for adjusting an injection mode during engine crank and/or run-up in response to engine events.

FIG. 6 shows an example routine for adjusting an injection mode during engine crank and/or run-up in response to engine events. First, at 610, the routine determines whether the current conditions include an engine start, crank, and/or engine speed run-up condition. This determination may be based on various indications, such as crankshaft position sensor, driver key position, etc. If so, the routine continues to 612 to determine whether event-based fuel injection is enabled. These may include, for example, whether the current start is a cold start after a predetermined engine shut-down time as compared to a hot restart with a shut-down time less than the predetermined time. Further, other conditions may be used, such as barometric pressure, coolant temperature, ambient temperature, etc. In one example, the routine continues to 614 only during engine cranking.

When the answer to 612 is yes, the routine continues to 614 to determine the cylinder event number. For example, the routine of FIG. 8 may be used to determine a cylinder combustion event number from a first combustion event during the start, or a cylinder fueling event number from a first fueling event during the start. Then, in 615, the routine determines whether the number of events is greater than a threshold valve (which may be varied with conditions such as engine speed, etc.). If not, the routine continues to 616. In 616, the routine determines a number of direct injections for the cylinder combustion cycle based at least on the event number of 614. Then, in 618, the routine determines a fuel injection amount (e.g., mass of injected fuel) for each injection based on various conditions, including the event number, cylinder air amount, air temperature, and others.

Then, in 620, the routine determines injection timing, stroke(s), and/or duration for each injection based on various conditions, including the event number. Next, in 622, the routine determines an ignition timing based at least on the event number of 614. Further, in 624, the routine may determine desired settings for various other actuators of the engine based on the event number, including charge motion control valve positions, swirl valve control positions, valve timing, EGR amount, etc. Then, in 626, the routine adjusts the various actuators and fuel injectors to deliver the desired conditions determined above.

Continuing with FIG. 6, when the answer to 612 is No, the routine continues to 630 to utilize a time-based injection mode and/or timing selection based on a time since engine start. Further, when the answer to 615 is yes, the routine continues to 632 to determine injection timing, amounts, and/or a number of injections independent of the event number.

By operating according to the example approach of FIG. 6, it is possible to vary the number of direct injections per cycle during a start, the timing/stoke of each injection, and/or a duration of each injection (e.g., fuel mass delivered) with event number to better match the fuel distribution and delivery to the rapidly varying cylinder conditions.

Figure 7:
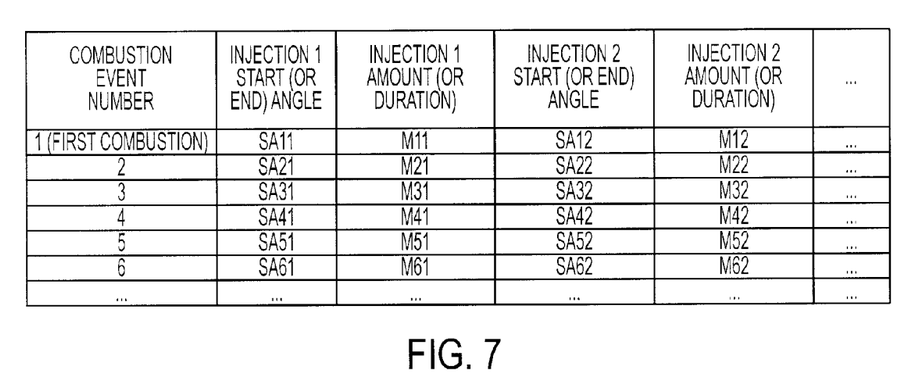
FIG. 7 shows an example data structure for storing event based fuel injection modes or timing for a plurality of operating conditions.

In one example, the various determinations of FIG. 6 may be re-arranged or combined, for example using various data structures such as that shown in FIG. 7. Specifically, FIG. 7 shows an example data structure that may be stored in memory of controller 12, for example, and used to adjust the number and/or timing of injections such as in FIG. 2 or 6. Specifically, FIG. 7 shows a start angle SA (in crank angle degrees) and an injection duration D (in crank angle degrees) for each of a first and second injection. While data for up to two injections is shown in this figure, additional data for addition injections may be used as indicated. Each start angle SA and duration D shown has two subscripts, the first denoting the event number and the second denoting the injection number. For example, $SA_{32}$ is the start angle for second injection in the third cylinder firing event. Also, the number of injections for a given event may be variable, even though data is stored for a given number of possible injections. For example, by zeroing one or more values, the injection may be eliminated for that event.

While this example shows start of injection angle and fuel amount values, various other parameters may be stored, such as start and end of injection angles, injection timing in terms of stroke, etc.

Figure 8:
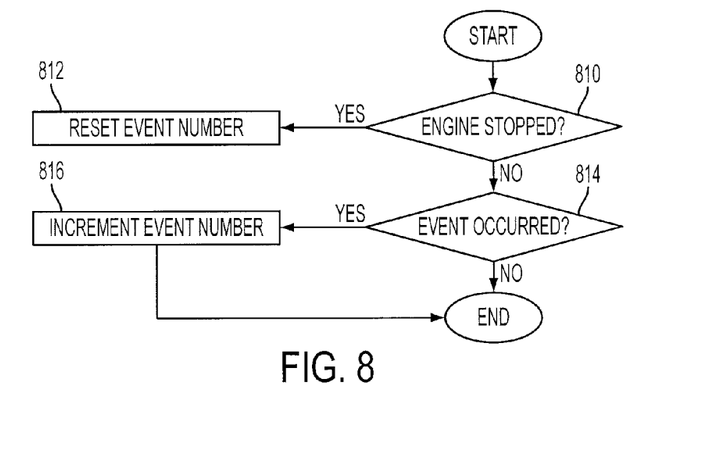
FIG. 8 shows an example high level flowchart for determining a cylinder event number.

Referring now to FIG. 8, a routine is described for determining an engine cylinder event count. In the described example, the cylinder event count is indicative of a number of combustion events from a first combustion event of an engine start. However, various other cylinder event counts may be used, such as a number of injections from a first injection event, a number of ignition events from a first ignition event, or others.

First, in 810, the routine determines whether the engine is currently stopped. If so, the count is reset to zero in 812. Otherwise, the routine continues to determine whether an event has occurred in 814. If so, the routine increases the cylinder event count by one in 816. Otherwise, the routine ends. Other parameters may be used to discontinue engine event counting (and reset), such as reaching a predetermined engine speed, an engine stall, an engine misfire, or others.

Figure 9A:
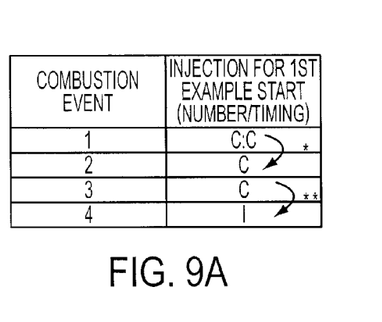
FIGS. 9A-9B show examples of varying a number or timing of injections during a start.
Figure 9B:
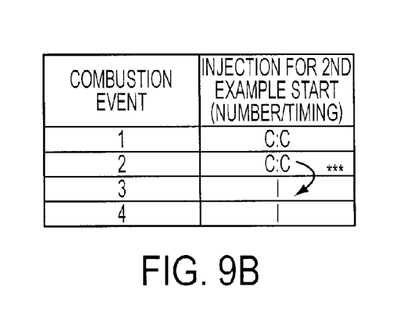

Referring now to FIGS. 9A-B, two tables are shown illustrating alternative examples of varying both injection stroke and a number of injections per cycle with event number. FIG. 9A shows a first example of varying injection number (*), and then varying injection timing (), whereas FIG. 9B shows a second example of varying both a number of injections and timing from within one event (*).

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

Figure 10A:
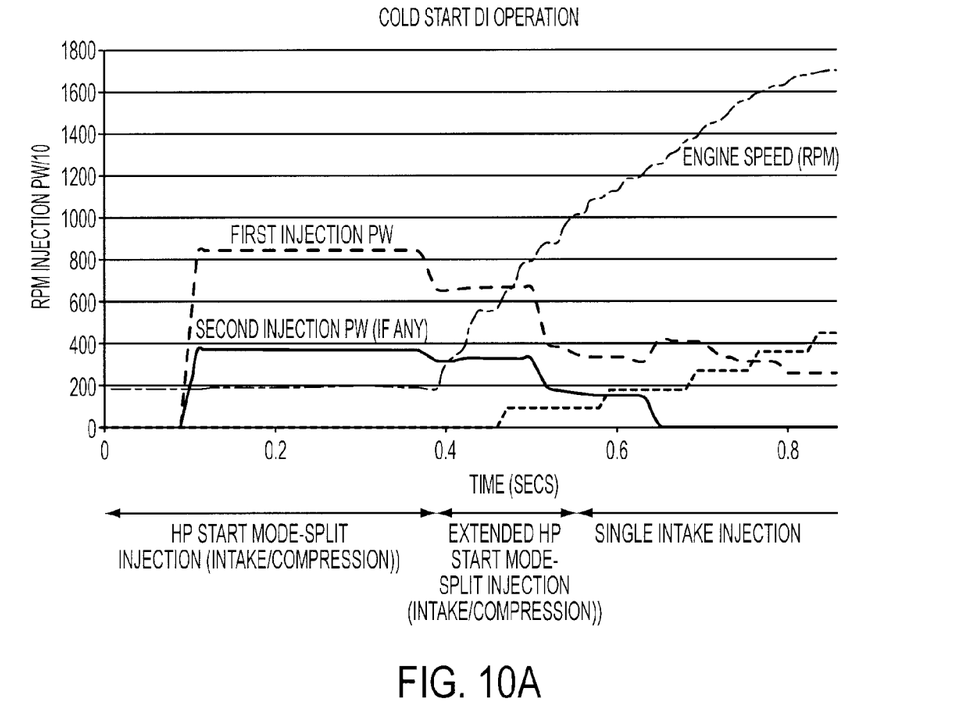
FIG. 10 shows example data for an engine start.
Figure 10B:
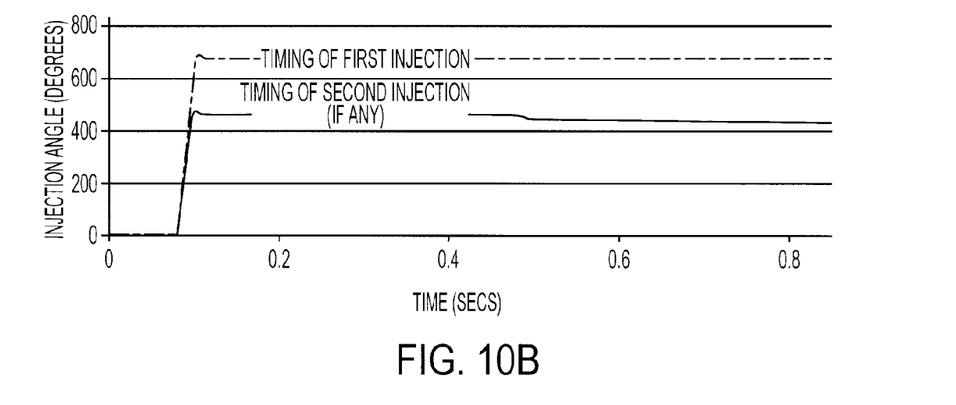

FIG. 10 shows an example engine start from rest with several injection modes active depending on the event number. The number of injections per cycle may be varied with a number of events, such as a number of combustion events from a first combustion event, a number of fueled cylinders from a first fueling event, etc. In this example, the first several cylinder fueling events a high pressure split injection (I:C) operation is used, which is then extended until a single intake injection is used thereafter. The figure shows cylinder combustion event number, along with engine speed and injection pulse width (PW) (and timing in the lower graph) for the first and second injections, when present. The graphs show how the injection timing and pulse width vary with events and other operating parameters to provide desired starting performance.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A direct fuel injection engine starting method, comprising:
    during cranking:
        counting a cylinder combustion event number from a first cylinder combustion event of the start, the first combustion event generated from an intake stroke injection and a compression stroke injection, and
        decreasing a number of direct injections per combustion cycle from the intake and compression stroke injections to a single intake stroke injection, and adjusting an air charge-motion valve, based on the counted number.

2. The method of claim 1 wherein the number of direct injections is further based on whether the start is after an idle/stop operation or a vehicle shutdown.

3. The method of claim 1 further comprising varying injection timing and relative amounts between multiple injections based on said event number.

4. The method of claim 3 wherein varying timing includes changing from compression injection to intake stroke injection after a predetermined number of counter events.

5. The method of claim 1 further comprising adjusting EGR level and cam timing based on said event number.

6. The method of claim 1 wherein said number of injections is further varied based on temperature.

7. A direct fuel injection engine method, comprising:
    counting a cylinder combustion event number from a first cylinder combustion event of a start,
    starting combustion with an intake stroke injection and a compression stroke injection;
    advancing a timing of the compression stroke injection based on said counted number reaching a first count;
    transitioning to one injection/cycle based on said counted number reaching a second count; and
    controlling the engine based on an operator foot pedal input.

8. The method of claim 7 wherein said first count is less than said second count.

9. The method of claim 8 wherein the start includes engine cranking.

10. The method of claim 9 wherein the number and timing of direct injections is further based on whether the start is after an idle/stop operation or a vehicle shutdown.

11. A method for an engine having direct fuel injection, comprising:
    during engine cranking, and during a first cylinder event,
        performing a first and second direct fuel injection, the first injection during an intake stroke, and the second injection during a compression stroke, of the first cylinder event;
        mixing said first and second injection with air in a cylinder; and
        combusting said first and second injections to generate a first combustion event of said cranking;
    transitioning from the first intake stroke injection and second compression stroke injection to a single intake stroke injection based on a counted number of cylinder events from the first cylinder event;
    adjusting a charge motion control valve position based on the counted number;
    adjusting an EGR level based on the counted number; and
    controlling the engine based on an operator foot pedal input.

* * * * *